(12) United States Patent
Sandford (10) Patent No.: US 9,183,248 B2
(45) Date of Patent: Nov. 10, 2015

(54) CONFIGURING OBJECT DISPLAYS

(75) Inventor: Greg Sandford, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1009 days.

(21) Appl. No.: 12/480,927

(22) Filed: Jun. 9, 2009

(65) Prior Publication Data

US 2010/0313122 A1  Dec. 9, 2010

(51) Int. Cl.
G06F 17/00 (2006.01)
G06F 17/30 (2006.01)
G06F 17/24 (2006.01)

(52) U.S. Cl.
CPC .......... *G06F 17/30418* (2013.01); *G06F 17/24* (2013.01); *G06F 17/30554* (2013.01); *G06F 17/30557* (2013.01); *G06F 17/30696* (2013.01)

(58) Field of Classification Search
CPC . G06F 17/24; G06F 17/30554; G06F 17/245; G06F 17/30277; G06F 17/30696; G06F 17/30418; G06F 17/30557
USPC .......... 715/273, 212, 217, 255, 256; 707/634, 707/805, 825, 803
See application file for complete search history.

(56) References Cited

U.S. PATENT DOCUMENTS

| | | | |
|---|---|---|---|
| 6,023,699 A | 2/2000 | Knoblock et al. | |
| 6,266,675 B1 | 7/2001 | Evans et al. | |
| 6,587,832 B1 * | 7/2003 | Beck et al. | 705/7.34 |
| 8,078,955 B1 * | 12/2011 | Gupta | 715/217 |
| 8,191,152 B1 * | 5/2012 | Barker et al. | 726/26 |
| 2003/0188258 A1 * | 10/2003 | Aureglia et al. | 715/503 |
| 2004/0243929 A1 * | 12/2004 | Jones et al. | 715/509 |
| 2005/0108271 A1 * | 5/2005 | Hurmiz et al. | 707/102 |
| 2005/0257053 A1 * | 11/2005 | Genty et al. | 713/167 |
| 2006/0041835 A1 * | 2/2006 | Chen et al. | 715/509 |
| 2006/0122977 A1 * | 6/2006 | Brodhun et al. | 707/3 |
| 2007/0022368 A1 * | 1/2007 | Bauchot | 715/503 |
| 2007/0033518 A1 * | 2/2007 | Kenna et al. | 715/503 |
| 2007/0050700 A1 * | 3/2007 | Simkhay et al. | 715/503 |
| 2007/0180386 A1 * | 8/2007 | Ballard et al. | 715/744 |
| 2008/0140636 A1 * | 6/2008 | Brodhun et al. | 707/3 |
| 2009/0132424 A1 * | 5/2009 | Kendrick et al. | 705/75 |
| 2009/0150831 A1 * | 6/2009 | Young et al. | 715/845 |
| 2009/0228435 A1 * | 9/2009 | Dattathreya | 707/3 |
| 2009/0282062 A1 * | 11/2009 | Husic | 707/100 |
| 2010/0100561 A1 * | 4/2010 | Cooper et al. | 707/769 |
| 2011/0004621 A1 * | 1/2011 | Kelley et al. | 707/769 |
| 2011/0040801 A1 * | 2/2011 | Macaleer et al. | 707/803 |

OTHER PUBLICATIONS

Excel, copyright 2001, pp. 1-6.*

(Continued)

*Primary Examiner* — Thu Huynh
(74) *Attorney, Agent, or Firm* — Miles & Stockbridge P.C.

(57) ABSTRACT

An object configuration module for configuring an object retrieves a view object associated with a user from a database. The view object may comprise a plurality of attributes. The object configuration module may further retrieve configuration information for the view object from the database. The configuration information may comprise properties of the attributes, and the properties may be customized by the user for the view object. The object configuration module may then set the properties for each of the attributes based on the retrieved configuration information.

19 Claims, 10 Drawing Sheets

(56) References Cited

OTHER PUBLICATIONS http://www.oracle.com/applications/human_resources/compensation-workbench.html; "Oracle Compensation Workbench"; May 21, 2009.

"About Oracle ADF View Objects"; http://download.oracle.com/otn_hosted_doc/jdeveloper/1012/bc4j/intro/bc_avo.html; last downloaded on Apr. 22, 2014.

"Interface ViewObject"; http://docs.oracle.com/cd/B14099_19/web.1012/b14022/oracle/jbo/ViewObject.html; last downloaded on Apr. 22, 2014.

* cited by examiner

CONFIGURING OBJECT DISPLAYS

FIELD

Embodiments of the invention are generally related to computer systems and, in particular, to an apparatus, system and method for configuring object display information.

BACKGROUND

Computer or web applications can be utilized to display information retrieved from a database system. The information may be displayed by the application in a table layout, for example. Typically, an application developer, at the time of design, would develop code to retrieve data from the database and to display the information in a table with designated properties and format. An end user of the application would not have the ability to configure the pre-designated properties or format of the data unless the end user had access to, and the ability to modify, the underlying code.

SUMMARY

One embodiment is directed to an object configuration module for configuring an object. The object configuration module retrieves a view object associated with a user from a database. The view object may comprise a plurality of attributes. The object configuration module may further retrieve configuration information for the view object from the database. The configuration information may comprise properties of the attributes, and the properties may be customized by the user for the view object. The object configuration module may then set the properties for each of the attributes based on the retrieved configuration information.

BRIEF DESCRIPTION OF THE DRAWINGS

For proper understanding of the invention, reference should be made to the accompanying drawings, wherein.

DETAILED DESCRIPTION

One embodiment is directed to a system for configuring an object, such as a table, plan, page or display, in accordance with an end user's preferences. Configuration information previously specified by a user, via a graphical user interface, for example, is retrieved from a database. The configuration information may be associated with the object, and may specify the user-requested configuration of the layout, display and attribute properties of the object. Customization of an object in this manner may provide a user with an increased level of security and privacy.

Figure 1:
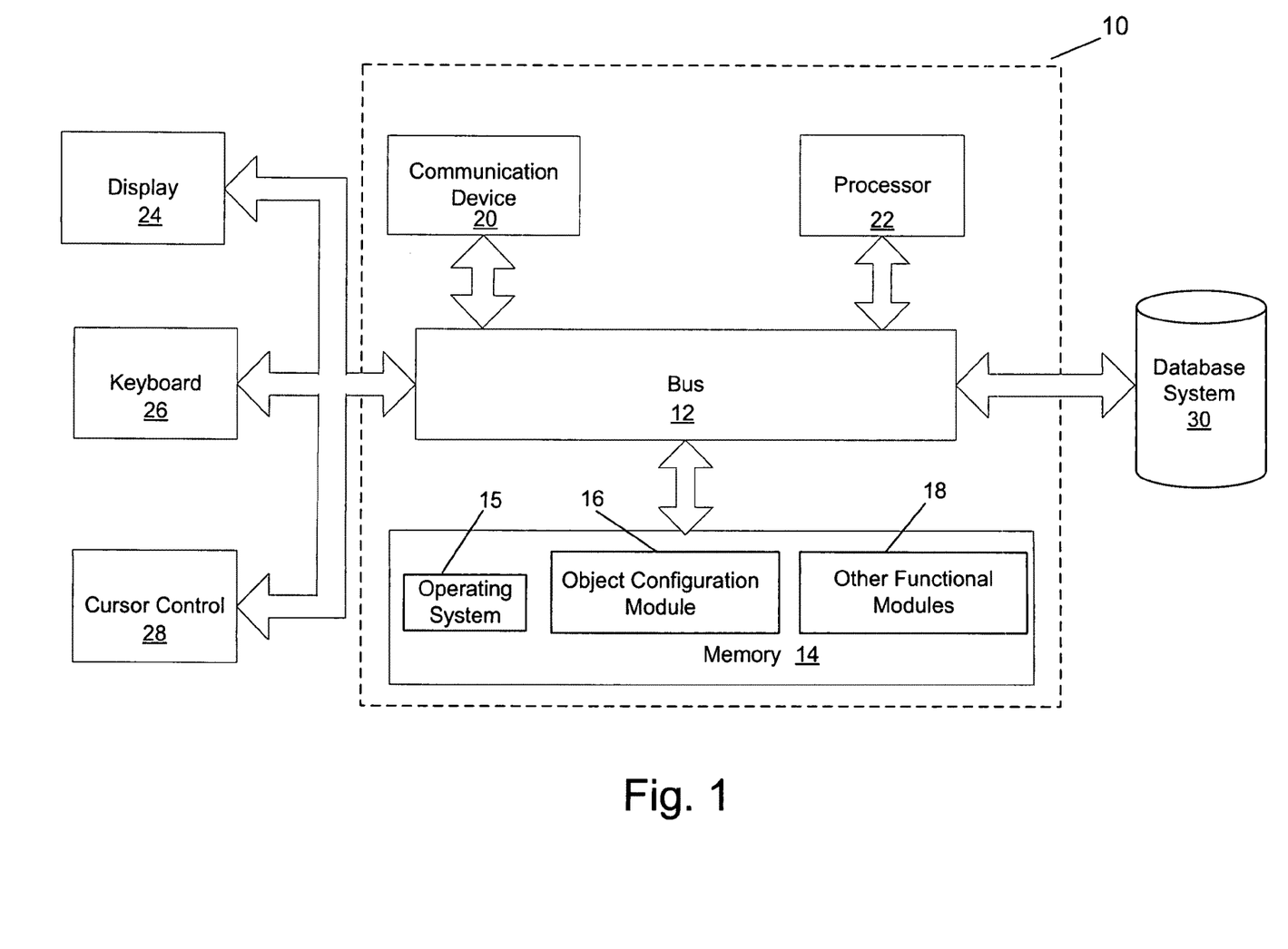
FIG. 1 illustrates a block diagram of an object configuration system that may implement an embodiment of the present invention.

FIG. 1 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments.

In one embodiment, memory 14 stores software modules that provide functionality when executed by processor 22. The modules may include an operating system 15 that provides operating system functionality for system 10. The memory may also store an object configuration module 16, which may be used to configure an object display based on a number of determinations, as discussed in more detail below. In other embodiments, object configuration module 16 may be a stand alone system or may be part of any other system.

System 10 may also include one or more other functional modules 18 to provide additional functionality. For example, other functional modules 18 may include a compensation workbench program. In one embodiment, the compensation workbench can allow managers and compensation professionals to plan, allocate, and model budgets and awards globally and across multiple currencies. The compensation workbench may also allow users to distribute budgets and compensation based on certain guidelines, in addition to providing a worksheet view of employees, performance ratings, and total compensation. Analytics within the compensation workbench may provide internal and external comparisons, statistical analysis, compensation history, and overviews of budgets and allocations to enable managers to make decisions that achieve certain objectives. In one embodiment, the compensation workbench is the "COMPENSATION WORK-BENCH" from Oracle Corporation.

Database system 30 may include a database server and any type of database, such as a relational or flat file database. Database system 30 may store data related to the object, the object configuration model 16, and/or any data associated with system 10 or its associated modules and components.

In one embodiment, system 10 may operate within a model-view controller ("MVC") framework. MVC may be operable to separate data of an application (the "model") from the user interface (the "view"), so that modifications to the user interface will not affect data handling and so that the data can be reorganized and/or altered without changing the user interface. In other words, MVC decouples data access and business logic from the data presentation and user interaction. In one embodiment, MVC is stored in memory 14. Additionally, MVC may be implemented in hardware alone, or in a combination of hardware and software.

In one embodiment, the model is a domain-specific representation of the information that the application operates. Domain logic adds meaning to raw data which, for example, may be the data stored in database 30. The view renders the model into a form suitable for interaction, such as a user interface. Multiple views can exist for a single mode for different purposes. The controller aspect of MVC processes and responds to events, typically user actions, and may invoke changes on the model. For example, the controller may notify the model of the user actions, possibly resulting in a change in the model's state. A view can use the model indirectly to generate an appropriate user interface. The model and controller need not have direct knowledge of the view.

In one embodiment, processor 22 and/or MVC can retrieve a view object associated with a user from database system 30. Processor 22 or MVC may also control object configuration module 16 to retrieve configuration information associated with the retrieved view object from the database system 30. Alternatively, processor 22 and/or MVC may directly retrieve the configuration information. The configuration information may have been previously defined and/or customized by a user associated with the view object. In one embodiment, the user may utilize a graphical user interface to setup the configuration information. Object configuration module 16 may then apply the retrieved configuration information to its associated view object. The view object, now configured according to the user-preferred configuration information, is then transmitted to display 24 for display to the user. Therefore, in some embodiments, the configuration information and the associated object may be stored, accessed and modified separately.

In certain embodiments, processor 22, MVC, object configuration module 16, and other functional modules 18 may be implemented as separate physical and logical units or may be implemented in a single physical and logical unit. Furthermore, in some embodiments, processor 22, MVC, object configuration module 16, and other functional modules 18 may be implemented in hardware, or as any suitable combination of hardware and software.

Figure 2:
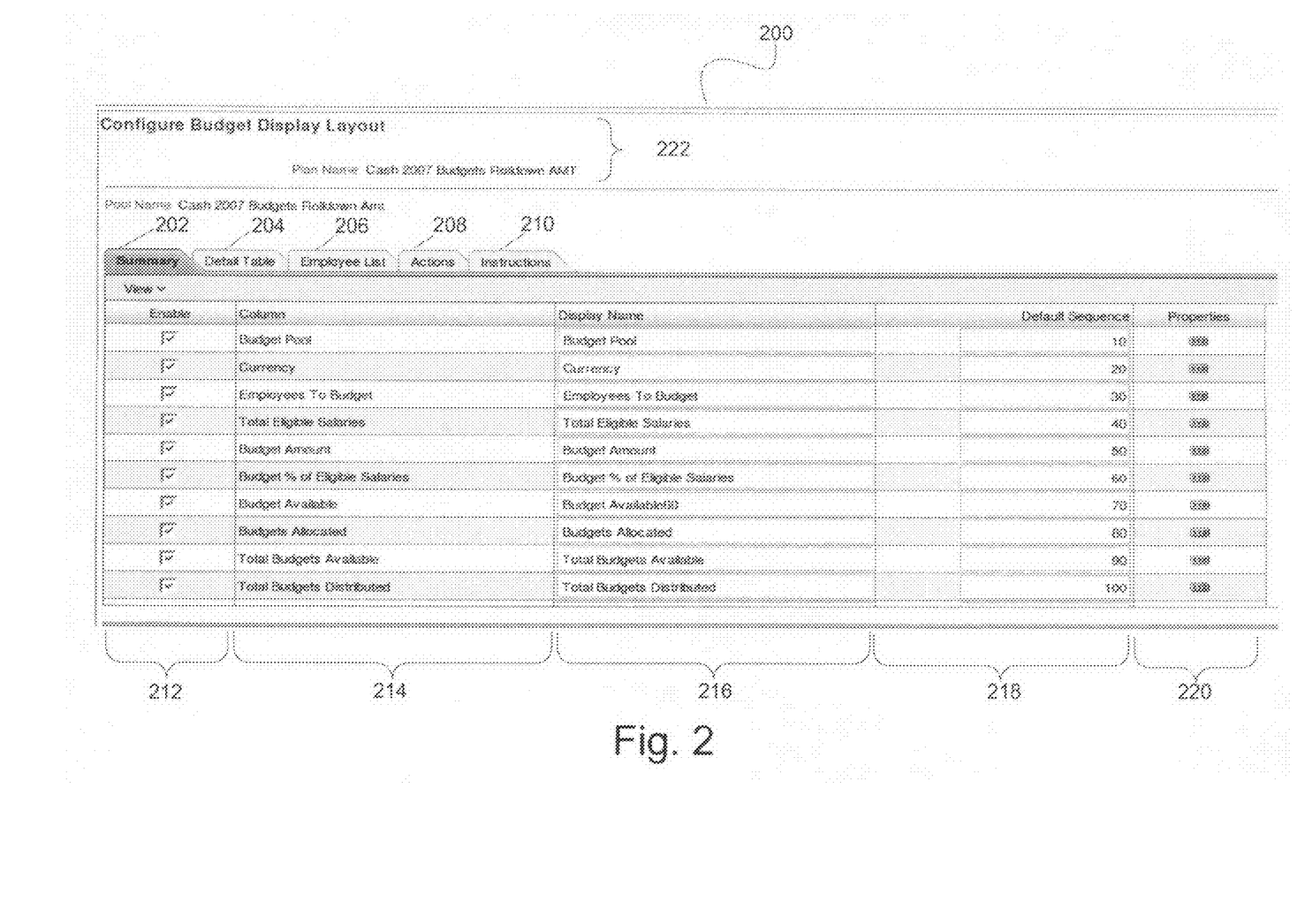
FIG. 2 illustrates a user interface according to one embodiment.

FIG. 2 illustrates an example of a configuration user interface 200 in which an end user may specify the configuration properties of attributes without having to manipulate the object (e.g., the actual table and its contents) and without having to hard-code a configuration of the attributes. Configuration user interface 200 may comprise a page or table that allows an end user to enter their preferences regarding the information and attributes to be displayed. In this example, user interface 200 shows a "Cash 2007 Budgets Rolldown AMT" plan 222.

For example, configuration user interface 200 may permit a user to specify and/or modify a table and its attributes or features. In one embodiment, configuration user interface 200 includes a "Summary" tab 202, a "Detail Table" tab 204, an "Employee List" tab 206, an "Actions" tab 208, and an "Instructions" tab 210. Summary tab 202, Detail Table tab 204, and Employee List tab 206 respectively correspond to a Summary table, Detail table, and Employee List table on budgeting pages of a web application, such as the compensation workbench program. Selection of one of these tabs allows the user to modify the features of a table corresponding to the selected tab. Each of the tables may be configured independently of the other tables.

FIG. 2 illustrates an instance in which the Summary tab 202 has been selected to customize the Summary table. Summary tab 202, therefore, allows a user to select and format certain features that are associated with the layout and display of the Summary table. Other tabs may provide similar customization features.

As illustrated in FIG. 2, Summary tab 202 may include an enable option 212 to enable the display of a corresponding column in the table. Column 214 lists the subject matter of a particular column within a table structure. The table structure may be a view object stored in database system 30, as discussed above. Display name 216 includes fields that allow a user to customize the header display name of the corresponding column 214. Default sequence 218 refers to the display order of the columns when the page is rendered. Default sequence 218 allows a user to specify the display order of the columns. In the example illustrated in FIG. 2, the numbers displayed in the default sequence column are incremented by ten in case the user decides they want to place a column in between 10 and 20, for example. As a result, the user can specify that a column should have a default sequence of 15 without having to reorder all the default sequence numbers for all the columns. In other embodiments, the user can enter any default sequence number and are not required to be in increments of 10. Properties 220 is a field that allows a user to specify the properties of each cell for a corresponding column 214. Properties 220 may include a link or icon that directs the user to a window that allows the user to select certain properties regarding each cell in the corresponding column 214.

Figure 3:
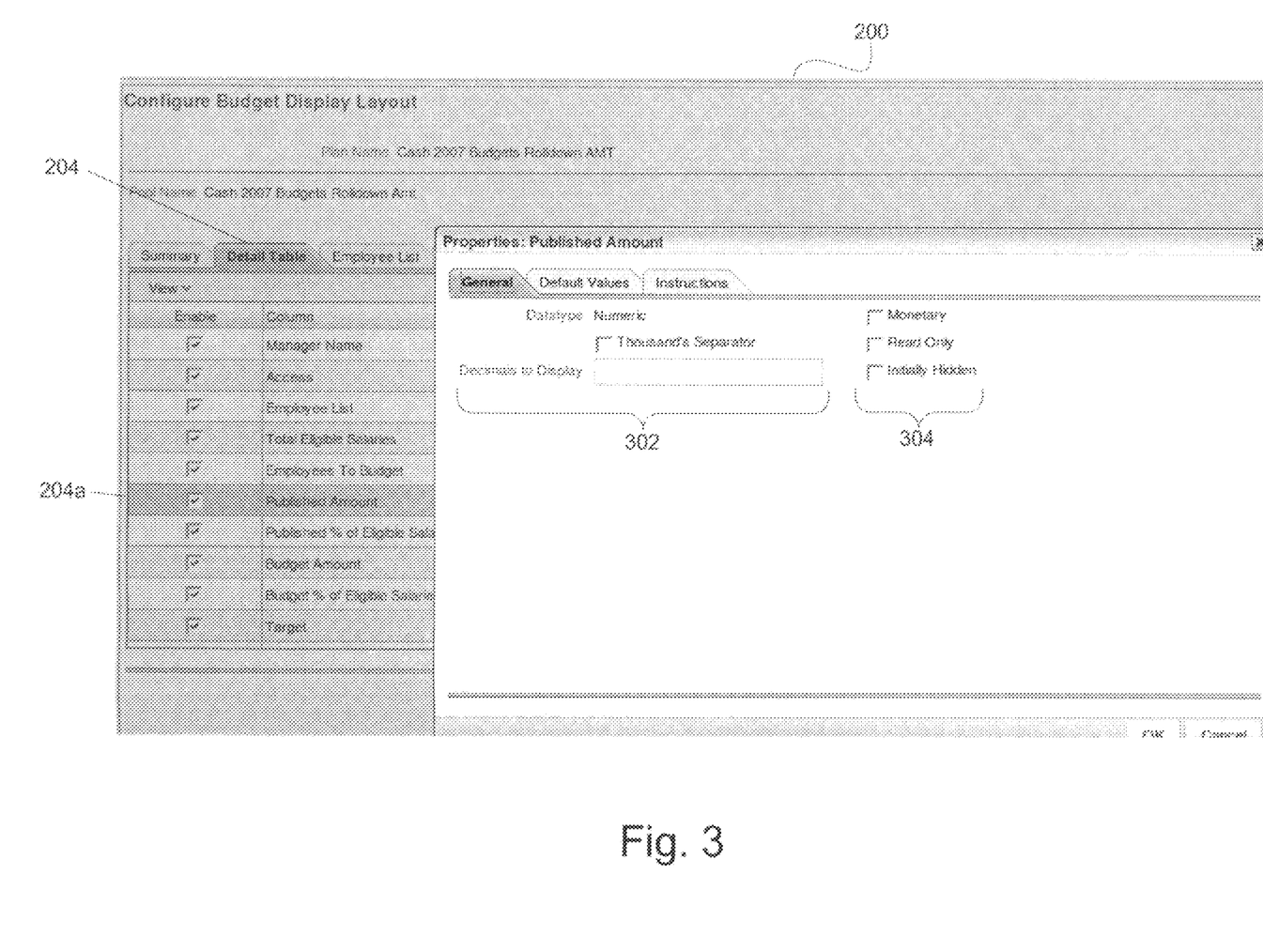
FIG. 3 illustrates a user interface in accordance with one embodiment.

FIG. 3 illustrates an example of a window 300 that appears when a properties icon is selected from the properties field 220. In particular, in this example, window 300 illustrates the configurable properties of the selected column, "Published Amount" 204A of the Detail Table 204. Window 300 may include a number of properties associated with the information that will populate the "Published Amount" column. For instance, these properties may include formatting properties 302, such as the datatype (e.g., numeric or alphabetical), the decimals to display, and whether the numeric data should include the thousand's separator. The datatype may be a fixed or changeable parameter, depending on the selected column. The configurable properties in window 300 may further include, a monetary display option, a read only option, and an initially hidden option 304.

Therefore, configuration user interface 200 and properties window 300 provide an interface in which an end user may configure a customized view of a table or page that corresponds to an object in the database system 30, including customizing the layout, display properties, and attribute properties. In an embodiment, configuration user interface 200 may allow a user to configure a number of preferences related to the display of the table. These preferences may include: column heading label, display order of the column within a table, initially hidden column setting (in which a column may be unhidden by certain table actions), a permanently hidden column setting, an editable column setting, number formatting properties, a rounding code, a monetary or non-monetary setting, and a spanning column feature (in which a spanned column is hidden if no sub-columns under the spanned columns are visible).

Figure 4:
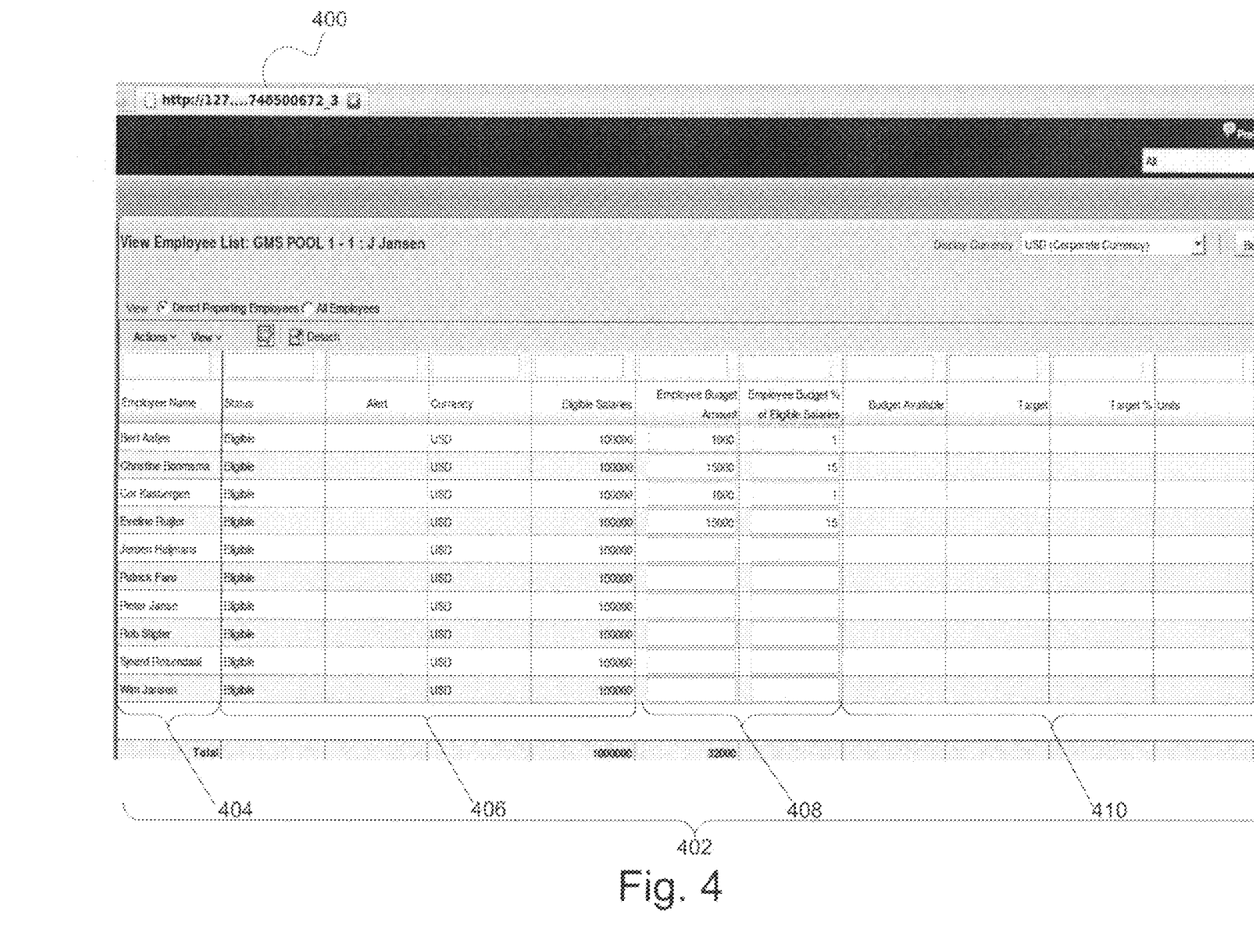
FIG. 4 illustrates a user interface according to an embodiment.

Once a user's configuration has been selected and submitted, system 10 is configured to automatically display a customized view of an object, such as a table, in accordance with the settings selected by the user (i.e., configuration information). FIG. 4 illustrates an example of a user interface 400 including a customized view of a table 402 that is displayed according to user preferences provided via configuration user interface 200 according to one embodiment. In this example, table 402 includes a personalized view of an employee list. Table 402 may be based on an object of an employee list stored in database system 30. Table 402 includes a listing of employee names in the "Employee Name" column 404. Table 402 may further include a section 406 of non-editable columns, including an eligibility status, alert, currency type, and eligible salaries. Section 408 may include editable columns, such as employee budget amount and employee budget percent of eligible salaries. Section 410 includes additional columns, such as budget available, target, target percent, and units. In the example illustrated in FIG. 4, the formatting properties of the numbers was not defined so the table 402 has been configured without a thousand's separator or decimals.

Figure 5:
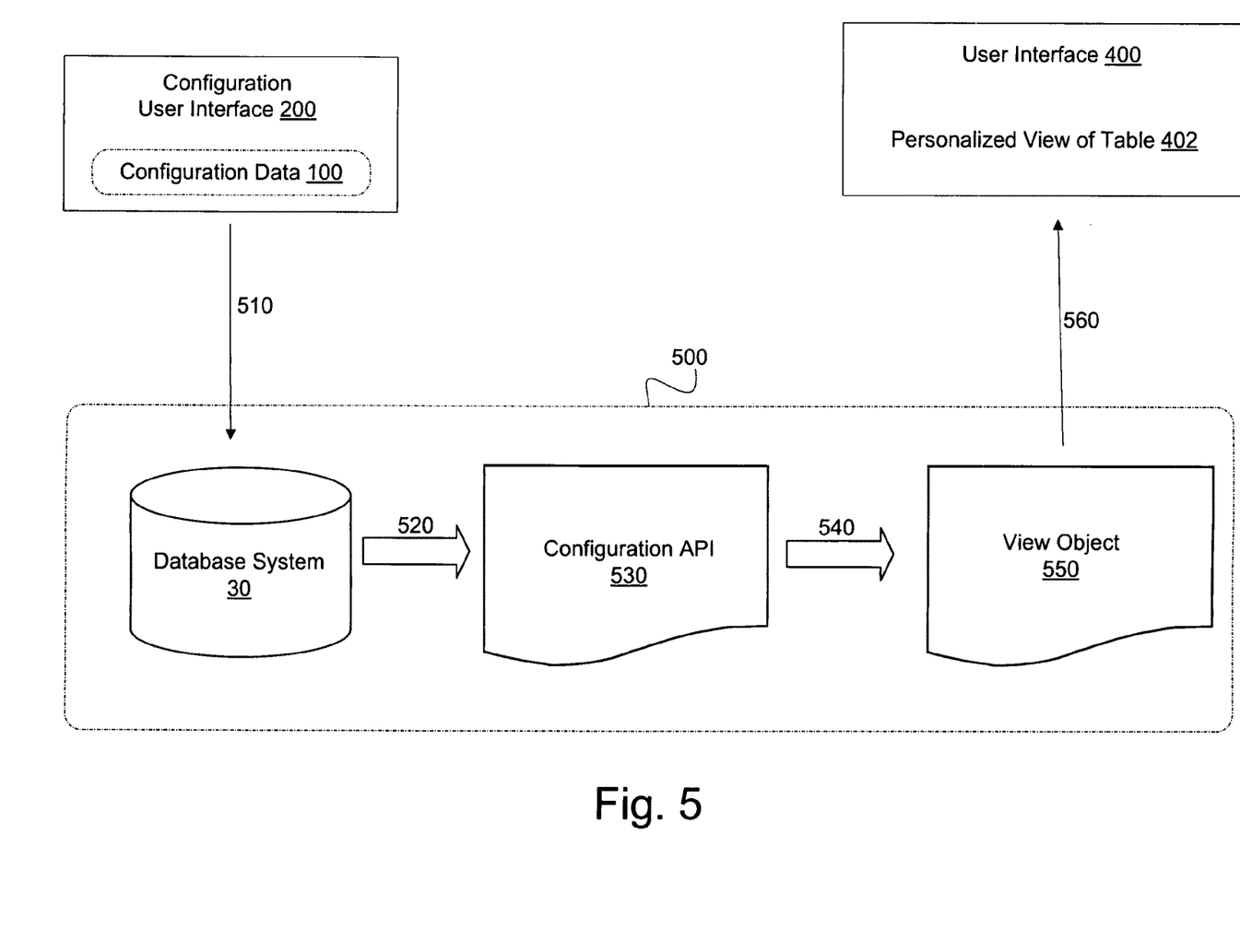
FIG. 5 illustrates a block diagram of a system according to one embodiment.

FIG. 5 illustrates a block diagram of a system 500 according to one embodiment. In one example, system 500 is configured to display a personalized view of an object based at least on configuration data 100 specified by an end user of the system through a configuration user interface 200. Configuration data 100 is provided 510 to database system 30 for storage. A configuration application programming interface 530 ("API") obtains 520 configuration information from database system 30. In one embodiment, the configuration information comprises at least the configuration data 100 specified by the user, and/or may additionally comprise default settings or properties. Configuration API 530 may then assign and set 540 the configuration information to the property attributes of a view object functionality 550. View object functionality 550, generally, refers to a mechanism that retrieves data from a data source such as a database system 30, and provides a flexible data result set that may be used to support a user interface.

In certain embodiments, instructions or operations may be implemented or processed by API 530, or by modules 15, 16, 18 of FIG. 1, in order to configure an object as discussed above. Example pseudo-code corresponding to these instructions or operations may be as follows:

```
public void displayProperties(String pageName, String
tableName, String customKey, ViewObject View) {
    Get the user's View Object
    Get the Configuration stored in the database for this plan,
page, table.
        For each attribute on this View Object {
        Get the name of the current attribute we are on and set the
column heading property.
        Get the Display Flag and set the Rendered property.
        Get the Initially Hidden Flag and set the Initially Hidden
property.
        Get the Updates Allowed Flag and set the Editable property.
        Get the Order Number and set the Index property.
        Get the Number of Decimals to display and the thousand
separator Flag and set the Number Format property.
        Get the rounding code and set the Rounding property.}}
```

Setting the property attributes in the view object functionality 550 allows for the presentation 560 of a logical view of an object (e.g., table 402 of FIG. 4) in accordance with the configuration information. As a result, in one example, an object (e.g., table 402 of FIG. 4) is configured and displayed in user interface 400 in accordance with the view that was set 540 by configuration API 530. According to one embodiment, configuration API 530 and view object functionality may be stored in memory 14, such as within operating system 15, object configuration module 16, or as an other functional module 18 of FIG. 1.

Figure 6:
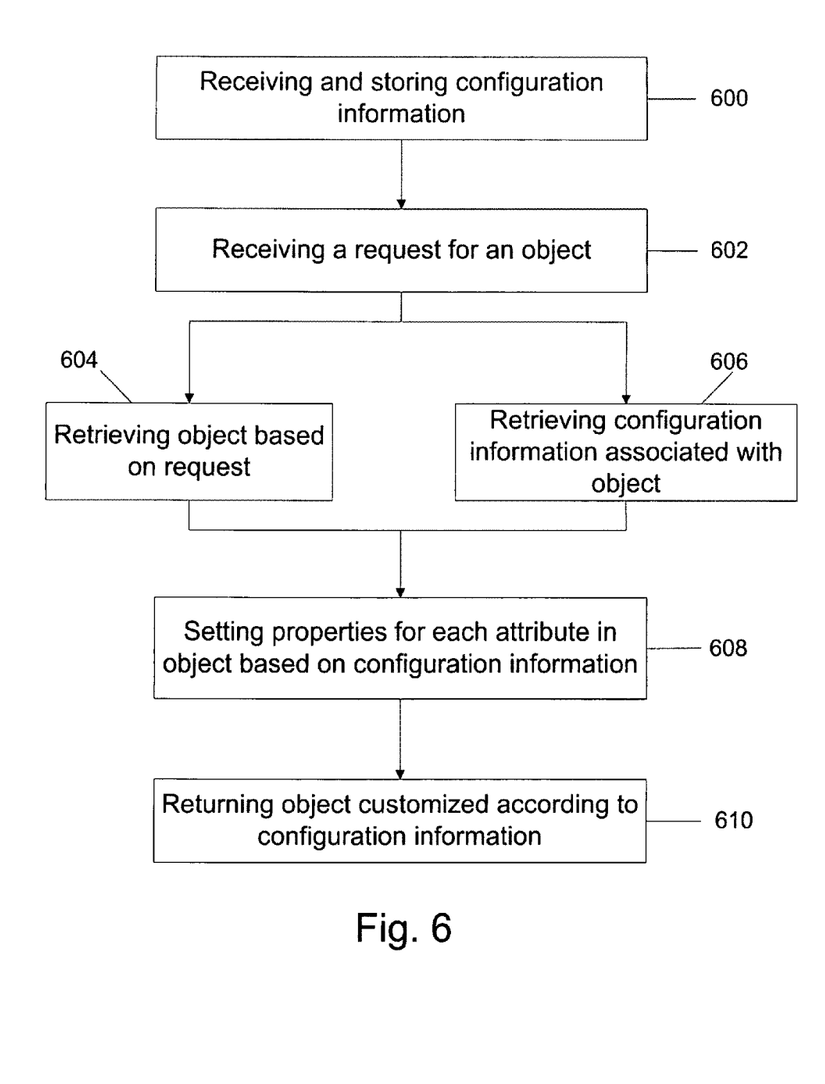
FIG. 6 illustrates a flow diagram of a method in accordance with one embodiment.

FIG. 6 illustrates a flow diagram of a process according to one embodiment. The process may include receiving and storing configuration information 600. In one embodiment, the configuration information is provided by a user via a graphical user interface, and the configuration information is received and stored by database system 30. At 602, a request for an object including certain parameters is received. In one example, the request is received by the configuration API, and the parameters include a plan identifier, page identifier, and/or table identifier. In some embodiments, a custom key parameter is also provided. The custom key is the key of a business object. The business object can be a compensation plan (plan_id) or a budget (pool_id) according to certain embodiments. Plan_id and pool_id are columns in database system 30. When additional business objects are created, the key for that object would also map to the custom key.

At 604, a view object associated with the current user and received parameters is retrieved. In one embodiment, the view object is retrieved from database system 30. At 606, the configuration information associated with the view object is obtained. In one embodiment, the configuration information is obtained based on the current user and based on the received parameters. The configuration information may also be stored in database system 30. The configuration information may include information relating to the current attribute, the display flag, the initially hidden flag, the updates allowed flag, the order number, the number of decimals to display, the thousand separator flag, and the routing code.

At 608, the properties for each attribute in the retrieved view object is set based on the configuration information. In one example, each view object has at least one associated set of configuration information. At 608, the view object customized according to the configuration information is provided to the user.

In one embodiment, the functionality of the diagrams illustrated in FIGS. 5 and 6 may be implemented by software stored in memory or other computer readable or tangible media, and executed by a processor. In other embodiments, the functionality can be performed by hardware (e.g. by an application specific integrated processor ("ASIC"), a programmable gate array ("PGA"), a field programmable gate array ("FGPA"), etc.), or any combination of hardware and software.

Figure 7:
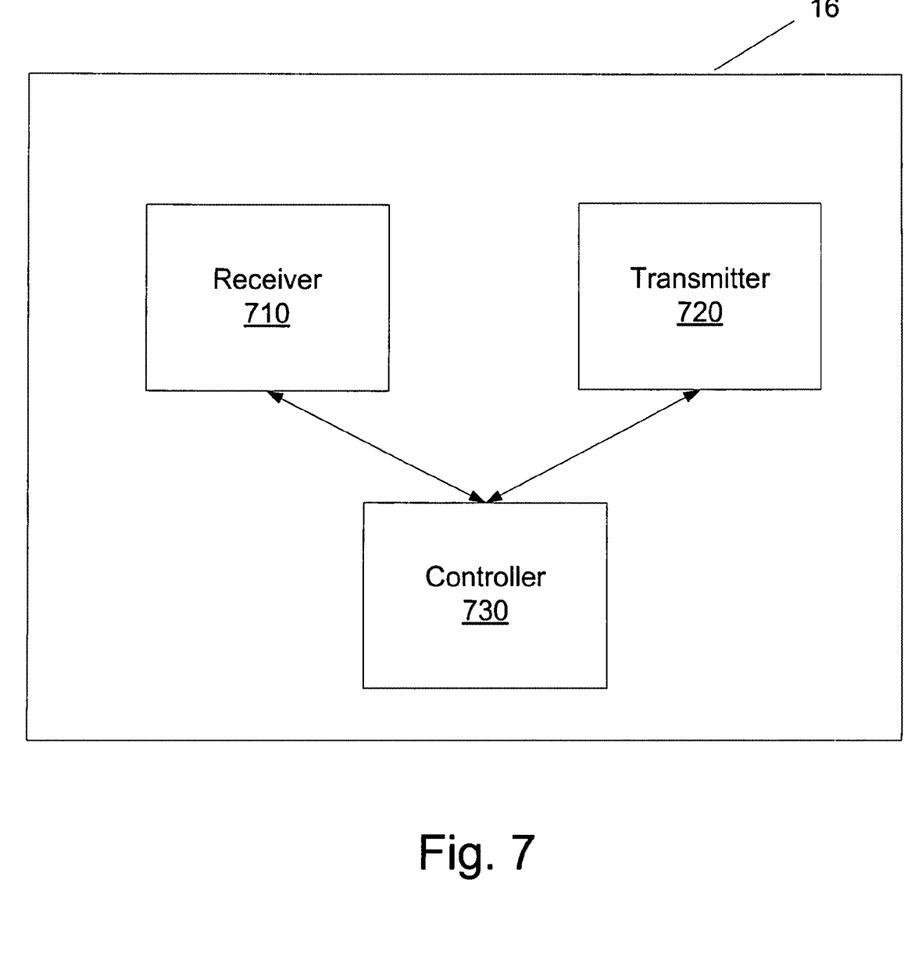
FIG. 7 illustrates an apparatus configured to implement one embodiment.

FIG. 7 illustrates an example of an object configuration module 16 for configuring an object. The object configuration module 16 may include a receiver 710 configured to receive information from other elements of system 10 including configuration information from a user. The receiver 710 may receive information, for example, from the user via keyboard 26 or cursor control 28. Receiver 710 may also be operable to receive information from database 30, or any other component of system 10. Object configuration module 16 may further include a transmitter 720 configured to transmit information to any other components of system 10, including display 24. Object configuration module 16 may also comprise a controller 730. The controller may be configured to obtain a view object associated with a user from database 30, and to retrieve configuration information for the view object from database 30. Controller 730 may also be configured to set the properties for each of the attributes of the view object based on the retrieved configuration information. In other embodiments, the components and functionality of FIG. 7 may be included in API 530 of FIG. 5.

Figure 8:
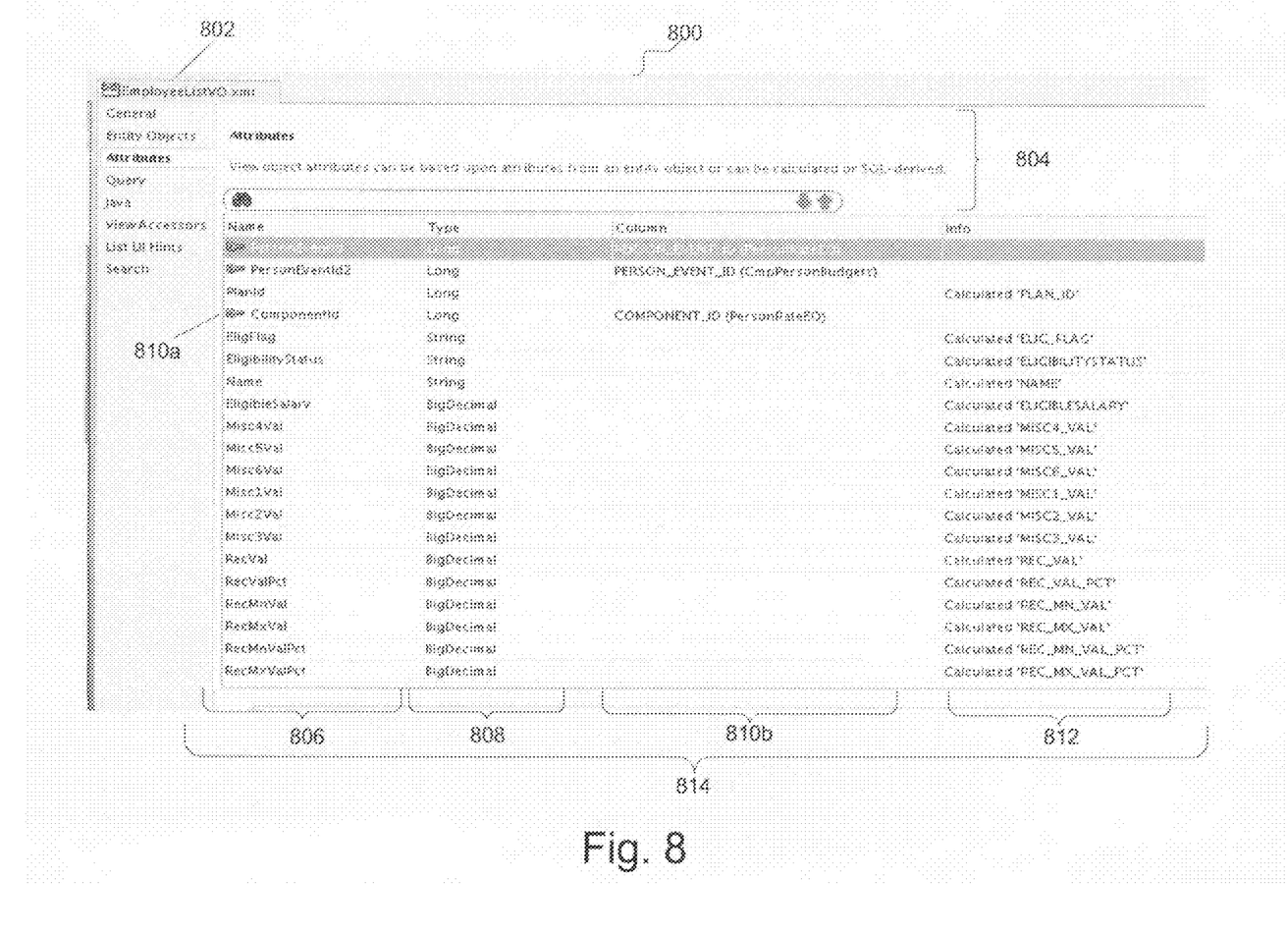
FIG. 8 illustrates a user interface according to one embodiment.

FIG. 8 illustrates a user interface 800 including attributes associated with a single view object in accordance with one embodiment. As mentioned above, a view object refers to a mechanism that retrieves data from a data source such as a database system 30, and provides a flexible data result set that may be used to support a user interface. In this example, FIG. 8 illustrates an "EmployeeList" view object 802. In one embodiment, the "EmployeeList" view object is an extensible markup language ("XML") file.

Each view object, such as the one illustrated in FIG. 8, may include a number of attributes. As indicated in section 804, view object attributes can be based upon attributes from an entity object, and may be calculated, or may be derived from a query (e.g., SQL-derived). For each attribute listed in name column 806, a corresponding type 808, column 810*b*, and related information 812 is displayed. Type 808 refers to a classification indicating a category of data such as numeric, string, long, big decimal, integer, floating point, Boolean, etc. The type 808 may determine the types of operations that may be performed on the corresponding data, and the way in which the data is stored. Column 810*b* identified a minimum set of columns that serve as a key value in database system 30 for the corresponding attribute 806. A key icon 810*a* is displayed for each attribute that refers to a key value. Information column 812 provides data relating the basis of the corresponding attribute and/or how it is calculated.

Figure 9:
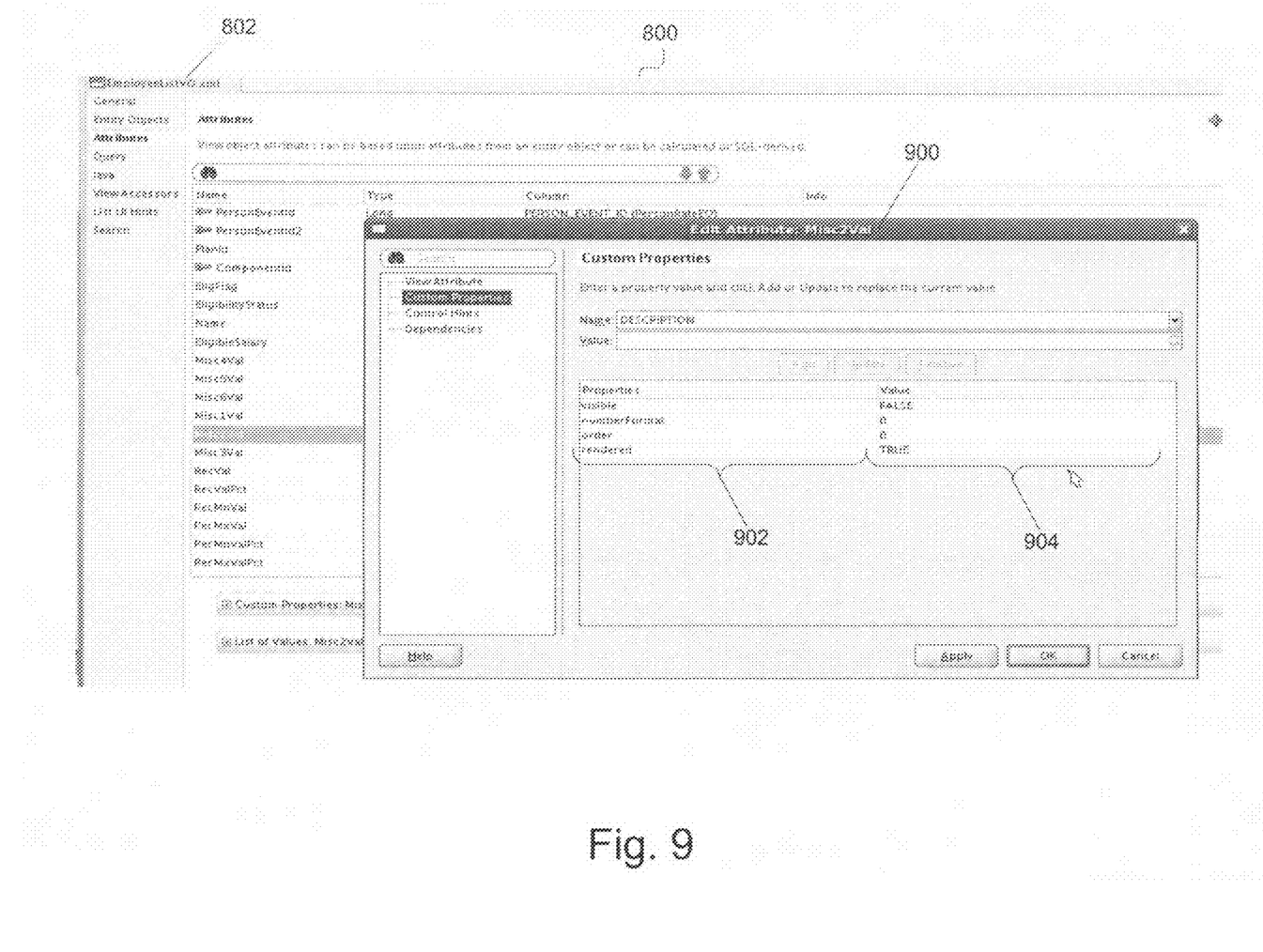
FIG. 9 illustrates a user interface in accordance with one embodiment.

FIG. 9 illustrates an example of a window 900 which may be used to edit an attribute of a view object according to one embodiment. In this embodiment, the value 904 of certain properties 902 may be edited. Each attribute listed in name column 806 of FIG. 8 may include similar editable custom properties.

Figure 10:
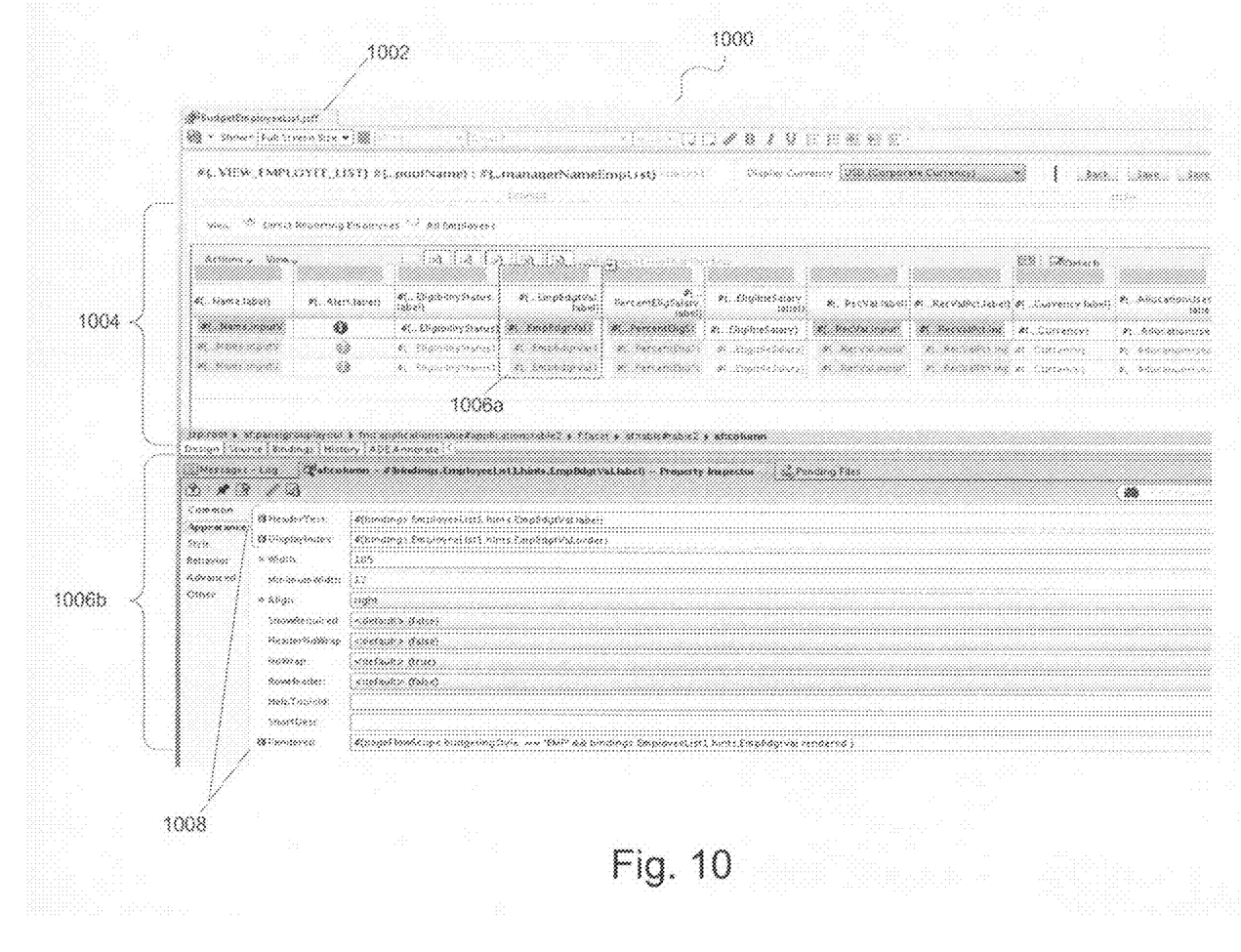
FIG. 10 illustrates a user interface according to one embodiment.

FIG. 10 illustrates an example of a user interface 1000 which may be used to develop a display of an associated object based on a user's configuration data in accordance with an embodiment. In one embodiment, user interface 1000 is a user interface associated with an Integrated Development Environment ("IDE"). In this example, "BudgetEmployeeList.jsff" file 1002 may be a java server face page fragment file ("JSFF"). Section 1004 includes user interface components that may be utilized to develop the display of an object (e.g., table 402 of FIG. 4). For example, each of the columns illustrated in section 1004, such as "EmpBdgtVal.label" 1006*a*, may correspond to columns to be displayed in the associated object. Further, section 1004 may also indicate the values that will populate the associated object (e.g., table 402). Section 1006*b* shows a detailed view of the properties and features associated with a selected column, which in this example is the "EmpBdgtVal.label" 1006*a* column. For instance, section 1006*b* illustrates the setting of the Header-Text property, the DisplayIndex property, and the Rendered property 1008. Section 1006*b* may include additional properties depending on the selected column.

Therefore, according to certain embodiments, a user is allowed to customize and configure the attributes of an object according to their preferences. In one embodiment, the user may specify their desired configuration of an object via a user interface. The user-specified configuration information may then be stored in a database or memory. In some embodiments, upon receipt of a request to view a certain object, a processor or object configuration module is configured to retrieve the requested object from the database or memory. The processor or object configuration module may additionally retrieve the user-specified configuration information associated with the object from the database or memory. In one embodiment, the object configuration module may then apply the retrieved configuration information to its associated view thereby setting the desired properties for each attribute in the object based on the configuration information. The resulting object customized according to the user-specified configuration information may then be returned and displayed to the user.

As a result of certain embodiments, an end user is provided with the discretion to customize the layout, display and properties of an object, such as a table. For example, the end user can have the option of hiding or modifying certain features of a table. Therefore, the user is afforded with a desired level of security and privacy since, for example, secure elements of the view may be hidden from display. Additionally, in certain embodiments, the user will only be required to configure the object, or provide configuration information, only once for each plan. Subsequently, whenever the user requests access to that object, it will be customized according to the user's previously provided configuration information. Alternatively, in one embodiment, a default setup is provided in cases where the user does not wish to provide any configuration information.

As mentioned above, certain embodiments may be implemented in a compensation and budgeting application. In the area of compensation and budgeting, different end users may desire to access and/or different information in each of their plans and budgets. Certain embodiments, as discussed above, easily allow an end user to configure a table for each plan and/or budget according to their specific requirements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The features, structures, or characteristics of the invention described throughout this specification may be combined in any suitable manner in one or more embodiments. Thus, embodiments may be practiced alone or in any combination. In order to determine the metes and bounds of the invention, therefore, reference should be made to the appended claims.

What is claimed is:

1. A non-transitory computer readable medium having instructions stored thereon that, when executed by a processor, cause the processor to configure an object display, the configuring comprising:
receiving configuration information from a user for configuring a first object, the configuration information comprising user-customized properties of the first object for displaying the first object;
storing the configuration information in a database;
storing a view object associated with the user in the database, the view object configured to retrieve data from the database and provide a flexible data result set to support a user interface;
receiving a request to display the first object;
in response to the request, retrieving the view object and the configuration information associated with the user from the database, and assigning and setting properties for each attribute of the view object based on the configuration information to generate a customized view object, wherein each view object attribute corresponds to a query column of the database, and the customized view object comprises a layout and display properties of the first object; and sending the customized view object to a first user interface associated with the user to display the first object in accordance with the layout and display properties of the customized view object;

wherein the customized view object is an Extensible Markup Language (XML) file.

2. The non-transitory computer readable medium of claim 1, wherein the configuration information comprises at least one of a current attribute, a display flag, an initially hidden flag, an updates allowed flag, an order number, a number of decimals, a thousand operator flag, or a rounding code.

3. The non-transitory computer readable medium of claim 1, wherein the properties comprise at least one of a column heading property, a rendered property, an initially hidden property, an editable property, an index property, a number format property, or a rounding property.

4. The non-transitory computer readable medium of claim 1, wherein the configuring further comprises:
receiving configuration information specifying a value for a display attribute for a cell of a table corresponding to the view object; and
storing configuration information for the cell, causing a format of the cell to be different than formats for other cells in the same column of the table.

5. The non-transitory computer readable medium of claim 1, wherein the first object comprises a table.

6. The non-transitory computer readable medium of claim 1, further comprising providing a configuration user interface to the user to customize the properties of the configuration information.

7. An object configuration module, comprising:
a processor;
a memory storing instructions coupled to the processor, wherein the processor executes the instructions to:
receive configuration information from a user for configuring a first object, the configuration information comprising user-customized properties of the first object for displaying the first object;
store the configuration information in a database;
storing a view object associated with the user in the database, the view object configured to retrieve data from the database and provide a flexible data result set to support a user interface;
receive a request to display the first object;
in response to the request, retrieve the view object and the configuration information associated with the user from the database, and assigning and setting properties for each attribute of the view object based on the configuration information to generate a customized view object, wherein each view object attribute corresponds to a query column of the database, and the customized view object comprises a layout and display properties of the first object; and
sending the customized view object to a first user interface associated with the user to display the first object in accordance with the layout and display properties of the customized view object;
wherein the customized view object is an Extensible Markup Language (XML) file.

8. The object configuration module of claim 7, wherein the configuration information comprises at least one of a current attribute, a display flag, an initially hidden flag, an updates allowed flag, an order number, a number of decimals, a thousand operator flag, or a rounding code.

9. The object configuration module of claim 7, wherein the properties comprise at least one of a column heading property, a rendered property, an initially hidden property, an editable property, an index property, a number format property, or a rounding property.

10. The object configuration module of claim 7, wherein the first object comprises a table.

11. A computer-implemented method for configuring an object display, the method comprising:
receiving configuration information from a user for configuring a first object, the configuration information comprising user-customized properties of the first object for displaying the first object using a model-view-controller framework;
storing the configuration information in a database;
storing a view object associated with the user in the database, the view object configured to retrieve data from the database and provide a flexible data result set to support a user interface;
receiving a request to display the first object;
in response to the request, retrieving the view object and the configuration information associated with the user from the database, and assigning and setting properties for each attribute of the view object based on the configuration information to generate a customized view object, wherein each view object attribute corresponds to a query column of the database, and the customized view object comprises a layout and display properties of the first object; and
sending the customized view object to a first user interface associated with the user to display the first object in accordance with the layout and display properties of the customized view object;
wherein the customized view object is an Extensible Markup Language (XML) file.

12. The method of claim 11, wherein the configuration information comprises at least one of a current attribute, a display flag, an initially hidden flag, an updates allowed flag, an order number, a number of decimals, a thousand operator flag, or a rounding code.

13. The method of claim 11, wherein the properties comprise at least one of a column heading property, a rendered property, an initially hidden property, an editable property, an index property, a number format property, or a rounding property.

14. The method of claim 11, wherein the first object comprises a table.

15. The method of claim 11, further comprising:
receiving configuration information specifying a value for a display attribute for a cell of a table corresponding to the view object; and
storing configuration information for the cell, causing a format of the cell to be different than formats for other cells in the same column of the table.

16. The method of claim 11, further comprising providing a configuration user interface to the user to customize the properties of the configuration information.

17. An object configuration module comprising:
a processor;
a memory storing instruction means coupled to the processor that when executed by the processor generate the following means:
means for receiving configuration information from a user for configuring a first object, the configuration information comprising user-customized properties of the first object for displaying the first object;

means for storing the configuration information in a database;

means for storing a view object associated with the user in the database, the view object configured to retrieve data from the database and provide a flexible data result set to support a user interface;

means for receiving a request to display the first object;

means for retrieving, in response to the request, the view object and the configuration information associated with the user from the database, and assigning and setting properties for each attribute of the view object based on the configuration information to generate a customized view object, wherein each view object attribute corresponds to a query column of the database, and the customized view object comprises a layout and display properties of the first object; and means for sending the customized view object to a first user interface associated with the user to display the first object in accordance with the layout and display properties of the customized view object;

wherein the customized view object is an Extensible Markup Language (XML) file.

18. The object configuration module of claim 17, wherein the processor further executes the instructions to:

receive configuration information specifying a value for a display attribute for a cell of a table corresponding to the view object; and store configuration information for the cell, causing a format of the cell to be different than formats for other cells in the same column of the table.

19. The object configuration module of claim 17, wherein the processor further executes the instructions to provide a configuration user interface to the user to customize the properties of the configuration information.

* * * * *